(12) United States Patent
Funakura

(10) Patent No.: US 8,807,587 B2
(45) Date of Patent: Aug. 19, 2014

(54) STROLLER

(75) Inventor: Kenji Funakura, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 119 days.

(21) Appl. No.: 13/258,689

(22) PCT Filed: Mar. 24, 2010

(86) PCT No.: PCT/JP2010/055051
§ 371 (c)(1),
(2), (4) Date: Oct. 28, 2011

(87) PCT Pub. No.: WO2010/113718
PCT Pub. Date: Oct. 7, 2010

(65) Prior Publication Data
US 2012/0056393 A1   Mar. 8, 2012

(30) Foreign Application Priority Data

Mar. 31, 2009   (JP) ................................ 2009-086084

(51) Int. Cl.
*B62B 7/08* (2006.01)

(52) U.S. Cl.
USPC ........ 280/642; 280/650; 280/47.36; 280/47.4

(58) Field of Classification Search
USPC ................. 280/47.34, 47.36, 47.38–47.4, 42, 280/641–644, 646, 647, 649, 650, 655.1, 280/47.371
See application file for complete search history.

(56) References Cited

U.S. PATENT DOCUMENTS

| 4,684,148 | A | * | 8/1987 | Glaser | 280/647 |
| 4,759,098 | A | * | 7/1988 | Ko | 16/29 |
| 4,779,879 | A | * | 10/1988 | Kassai | 280/47.36 |
| 5,029,886 | A | * | 7/1991 | Takahashi et al. | 280/93.504 |
| 5,191,675 | A | * | 3/1993 | Ishikura | 16/35 R |
| 5,215,320 | A | * | 6/1993 | Chen | 280/47.36 |
| 6,212,733 | B1 | * | 4/2001 | Yeh | 16/35 R |
| 6,508,605 | B1 | * | 1/2003 | Cheng | 403/83 |
| 7,367,581 | B2 | * | 5/2008 | Yang | 280/642 |
| 8,210,563 | B2 | * | 7/2012 | Dotsey et al. | 280/647 |
| 8,297,643 | B2 | * | 10/2012 | Funakura | 280/648 |
| 2003/0204933 | A1 | * | 11/2003 | Yeh | 16/35 R |

(Continued)

FOREIGN PATENT DOCUMENTS

| EP | 2 138 375 A1 | 12/2009 |
| EP | 2 138 376 A1 | 12/2009 |

(Continued)

OTHER PUBLICATIONS

Japanese Office Action dated May 7, 2013 with English translation. 9 pages.

*Primary Examiner* — Hau Phan
*Assistant Examiner* — Travis Coolman
(74) *Attorney, Agent, or Firm* — Birch, Stewart, Kolasch & Birch, LLP

(57) ABSTRACT

A stroller includes: a frame part; a handle connected to the frame part so as to be swingable; caster mechanisms turnably holding wheels; and a switching mechanism including a switching member which is configured to be held on predetermined positions in accordance with the position of the handle. The caster mechanisms are provided with locking members configured to regulate turning of the wheels. In addition, there are provided transmission mechanism configured to operate the locking members in conjunction with a movement of the switching member.

18 Claims, 11 Drawing Sheets

(56) References Cited

U.S. PATENT DOCUMENTS

| | | |
|---|---|---|
| 2005/0194755 A1* | 9/2005 | Lan .......................... 280/47.38 |
| 2006/0043688 A1* | 3/2006 | Chang ...................... 280/47.38 |
| 2007/0063470 A1* | 3/2007 | Lan .......................... 280/47.38 |
| 2007/0132207 A1* | 6/2007 | Moriguchi et al. ........... 280/642 |
| 2010/0109271 A1 | 5/2010 | Funakura |
| 2010/0127481 A1 | 5/2010 | Funakura |
| 2010/0156060 A1* | 6/2010 | Dotsey et al. ............ 280/47.371 |
| 2010/0194065 A1* | 8/2010 | Mountz et al. ............ 280/47.36 |

FOREIGN PATENT DOCUMENTS

| | | |
|---|---|---|
| JP | 63-184567 A | 7/1988 |
| JP | 2002-284015 A | 10/2002 |
| JP | 2006-117012 A | 5/2006 |
| JP | 2008-254688 A | 10/2008 |
| JP | 2008-254693 A | 10/2008 |
| WO | 2008/059919 A1 | 5/2008 |

\* cited by examiner

STROLLER

TECHNICAL FIELD

The present invention relates to a stroller including a handle that is swingable between a forward inclined position and a rearward inclined position. In particular, the present invention pertains to a stroller in which wheels disposed on front legs or rear legs can be automatically switched, in accordance with a position of the handle, into a turnable condition or an unturnable condition with respect to the back and forth direction of the stroller.

BACKGROUND ART

There have been conventionally known strollers for carrying a baby facing forward in the traveling direction. In addition, widely used in recent years are strollers including a handle that is swingable between a first position (front pushing position) at which the handle is inclined forward of a vertical axis when viewed from the lateral side, and a second position (back pushing position) at which the handle is inclined rearward of the vertical axis. In such a stroller, when the handle is located on the second position, an operator (parent) can push forward the stroller with the baby facing forward in the traveling direction, grasping the handle from a back side of the baby. On the other hand, when the handle is located on the first position, the operator can push forward the stroller with the rear legs facing forward in the traveling direction, grasping the handle from a side of the front legs on which the operator faces the baby.

In consideration of manipulability of the stroller, it is preferable that wheels disposed on the legs facing forward in the traveling direction are turnable with respect to the back and fourth direction, while wheels on the legs facing rearward in the traveling direction are unturnable with respect to the back and forth direction. JP2002-284015A discloses a stroller in which the wheels disposed on the front legs and the rear legs can be automatically switched, in accordance with a position of the handle, into the turnable condition or the unturnable condition with respect to the back and forth direction.

In the stroller disclosed in JP2002-284015A, sliding members (lock switching members) are slidably provided on the front legs. The sliding members are pushed to be slid by the handle which is being swung toward the first position (front pushing position), whereby the wheels can be switched into the turnable condition or the unturnable condition.

However, inclined angles of the front legs and a swinging range of the handle are set in relation to other structures of the stroller, in terms of comfortableness and manipulability. Thus, it is impossible in all the strollers to align a direction in which the handle pushes the lock switching member, with a direction in which the lock switching member is slidable, i.e., with a direction in which the front leg is extended. In this case, there is a possibility that the lock switching members cannot be smoothly slid by the swinging of the handle. In other words, an operation of the lock switching member by the handle cannot be always performed in a stable and reliable manner. In the first place, depending on the overall structure of the stroller, it may be inappropriate to swing the handle up to a position on which the handle is located on the lateral sides of the front legs, with a view to facilitating grasping and operating of the handle. In this case, it becomes impossible to push the lock switching member by swinging the handle.

DISCLOSURE OF THE INVENTION

The present invention has been made in view of these respects. The object of the present invention is to provide a stroller allowing an operation for switching the conditions of the wheels in accordance with a position of the handle to be performed in a more stable and reliable manner.

A stroller according to the present invention comprises: a frame part including a front leg and a rear leg; a handle connected to the frame part so as to be swingable between a first position and a second position; a caster mechanism disposed at least on one of the front leg and the rear leg, the caster mechanism including a wheel, a wheel holder configured to rotatably and turnably hold the wheel, and a locking member capable of being moved between a locking position for regulating a turning of the wheel and an unlocking position for enabling the turning of the wheel; a switching mechanism including a switching member which is configured to be held on a first holding position when the handle is located on the first position, and to be held on a second holding position when the handle is located on the second position; and a transmission mechanism disposed between the switching mechanism and the caster mechanism, and configured to transmit, to the locking member, a movement of the switching member between the first holding position and the second holding position, so as to move the locking member from the unlocking position to the locking position or from the locking position to the unlocking position.

In the stroller according to the present invention, the switching member may be slidably disposed on the handle. The switching member may be arranged on the first holding position on the handle when the handle is located on the first position, and may be arranged on the second holding position on the handle, which is different from the first holding position, when the handle is located on the second position.

In such a stroller according to the present invention, the frame part may further includes: a first engagement member that is engaged with the switching member, when the handle is located on the first position, so as to hold the switching member on the first holding position; and a second engagement member that is engaged with the switching member, when the handle is located on the second position, so as to hold the switching member on the second holding position. In the stroller, the frame part may further include an armrest connected with the front leg and the rear leg, and the first engagement member and the second engagement member may be disposed on the armrest. In addition, in this stroller, the switching member and the frame part may be structured such that, when the switching member is engaged with the first engagement member, the swinging movement of the handle from the first position is regulated, and that, when the switching member is engaged with the second engagement member, the swinging movement of the handle from the second position is regulated.

In addition, in such a stroller according to the present invention, the switching member may be movable on the handle in a longitudinal direction of the handle, and a distance between the switching member and a swing center of the handle along the longitudinal direction of the handle may differ depending on whether the switching member is located on the first holding position, or the switching member is located on the second holding position.

Alternatively, in the stroller according to the present invention, the switching member may be pivotably supported on the frame part, the switching member may include a projecting part that is projectable in a trajectory zone of the handle, which is defined when the handle is swung, or a trajectory zone of a member disposed on the handle, which is defined when the handle is swung, and the switching member may be structured such that, when the handle or the member disposed on the handle presses the projecting part during a movement of the handle from the first position to the second position or from the second position to the first position, the switching member is turned between the first holding position and the second holding position.

In such a stroller according to the present invention, the frame part may further include an armrest connected with the front leg and the rear leg, and the switching member may be pivotably supported on the armrest.

In addition, in such a stroller according to the present invention, the switching member may includes: a first projecting part structured such that, when the switching member is located on the second holding position, the first projecting part projects in the trajectory zone of the handle or in the trajectory zone of the member disposed on the handle, so as to be pressed by the handle or the member disposed on the handle during the swinging movement of the handle from the second position toward the first position; and a second projecting part structured such that, when the switching member is located on the first holding position, the second projecting part projects in the trajectory zone of the handle or in the trajectory zone of the member disposed on the handle, so as to be pressed by the handle or the member disposed on the handle during the swinging movement of the handle from the first position toward the second position.

Further, in such a stroller according to the present invention, the switching mechanism may be structured such that, when the switching member is located on an intermediate position between the first holding position and the second holding position, the switching member is urged toward the first holding position or the second holding position.

In addition, in the stroller according to the present invention, a caster mechanism for front leg may be disposed on a lower end of the front leg, a caster mechanism for rear leg may be disposed on a lower end of the rear leg, the transmission mechanism (first transmission mechanism) may be disposed between one of the caster mechanism for front leg and the caster mechanism for rear leg and the switching mechanism, and the transmission mechanism (second transmission mechanism) may be disposed between the other of the caster mechanism for front leg and the caster mechanism for rear leg and the switching mechanism. In such a stroller according to the present invention, the handle may be inclined forward on the first position, and may be inclined rearward on the second position. When the handle is located on the first position, the turning of the wheel of the caster mechanism for front leg may be regulated. When the handle is located on the second position, the turning of the wheel of the caster mechanism for rear leg may be regulated.

MODE FOR CARRYING OUT THE INVENTION

One embodiment of the present invention will be described below with reference to the drawings.

Figure 1:
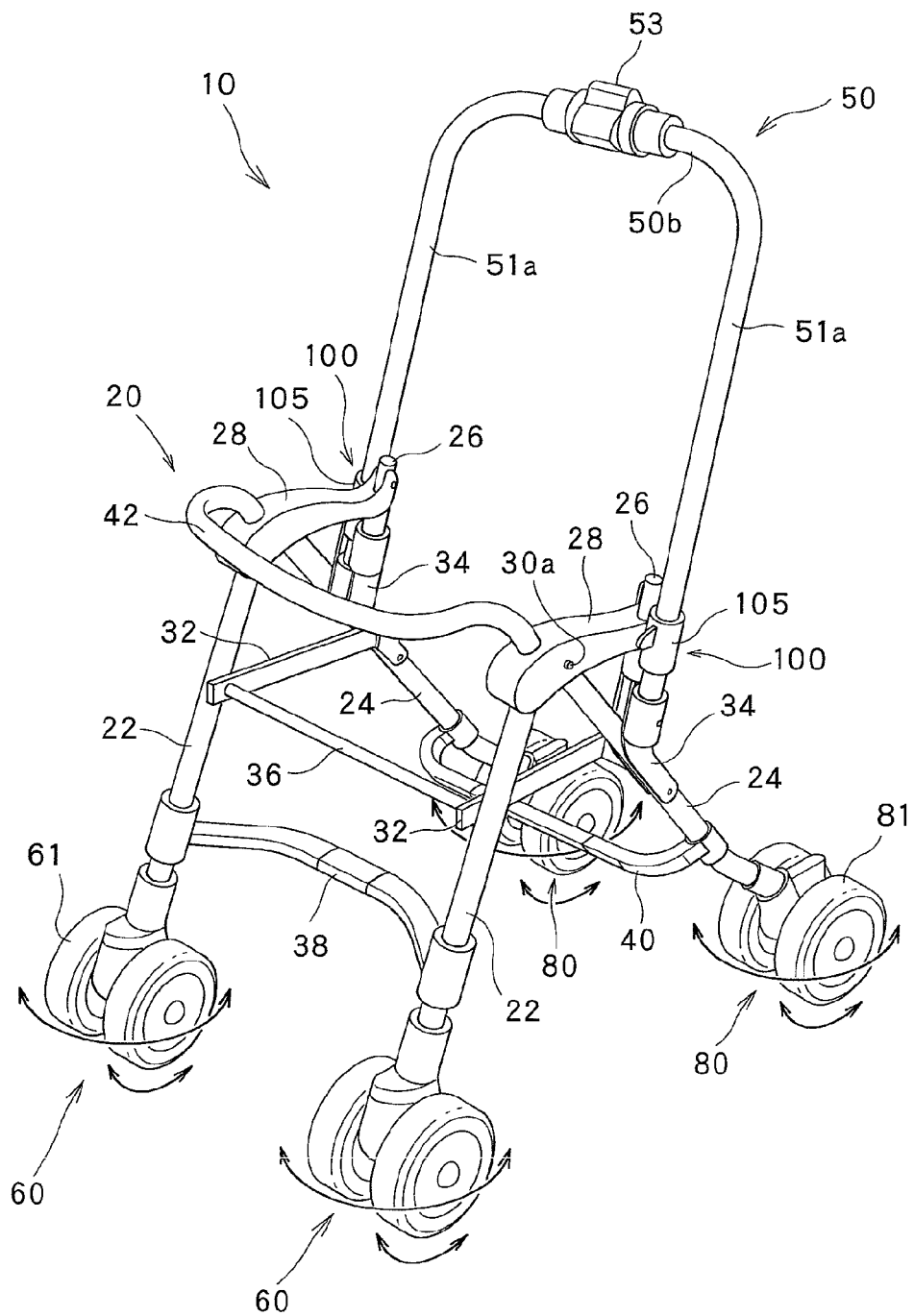
FIG. 1 is a perspective view for explaining an overall structure of a stroller in one embodiment of the present invention.
Figure 2:
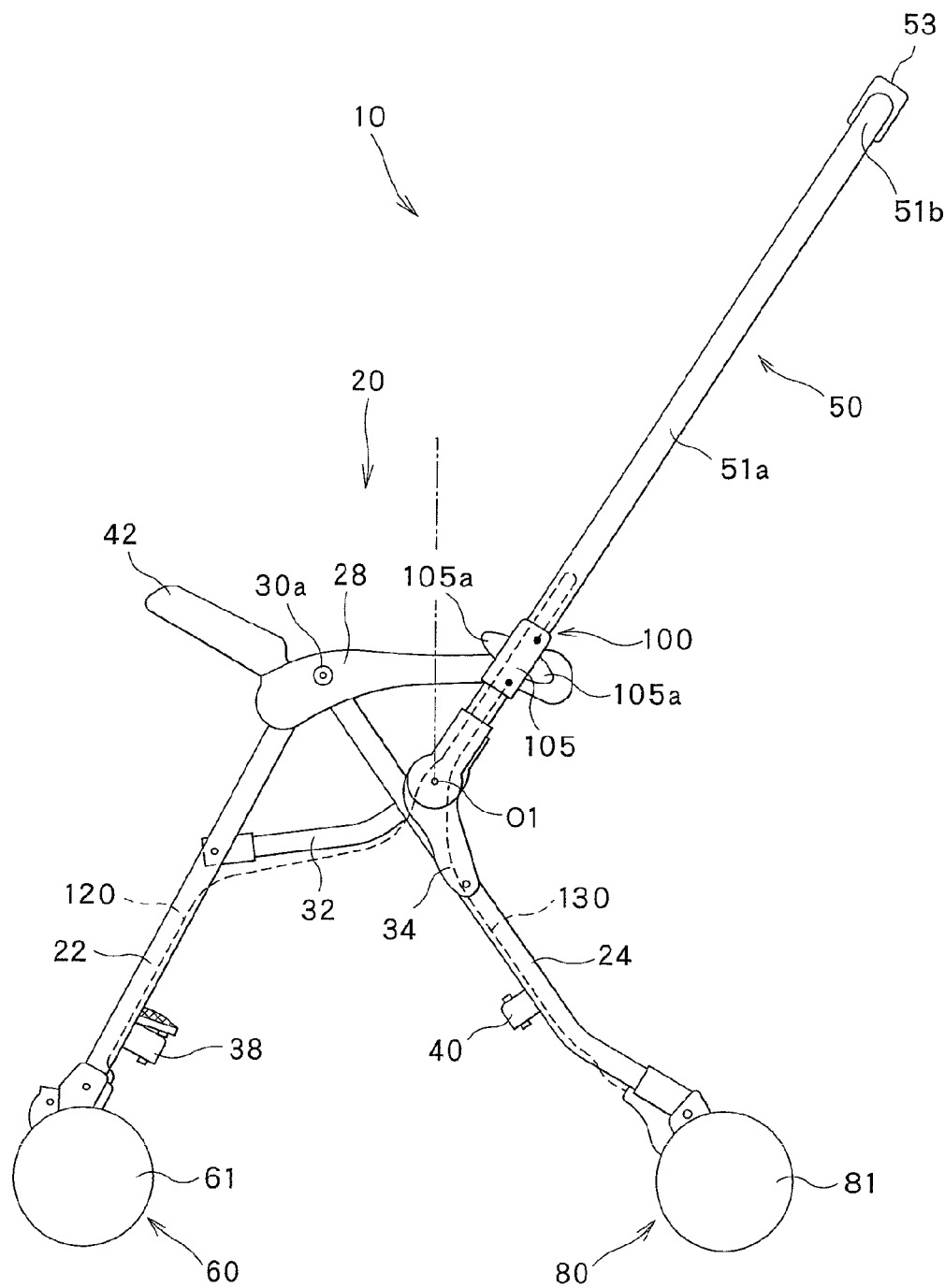
FIG. 2 is a side view of the stroller, with a handle thereof being located on a second position (backside pushing position).
Figure 3:
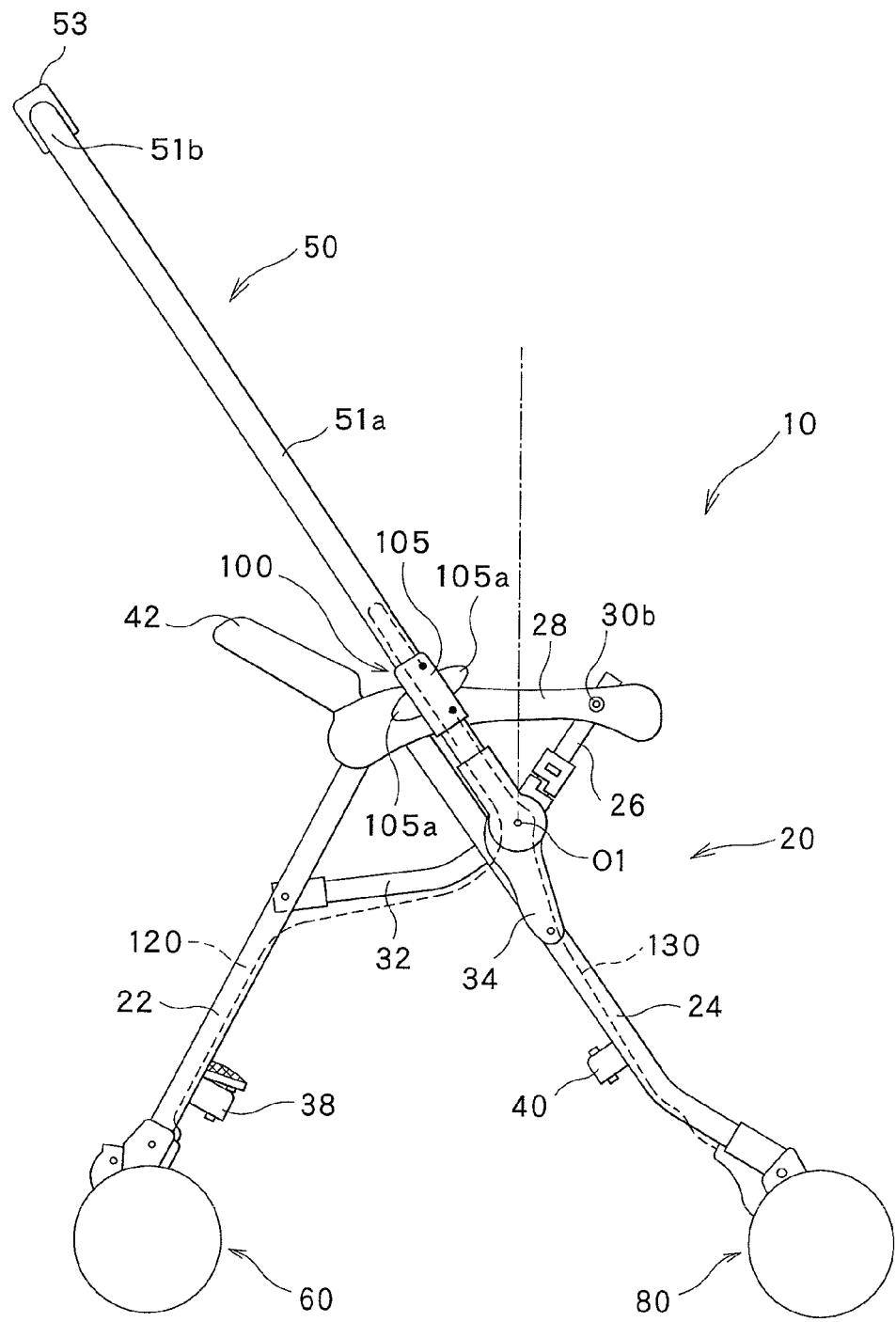
FIG. 3 is a side view of the stroller, with the handle being located on a first position (face-to-face pushing position).

FIGS. 1 to 10 are views for explaining a stroller in one embodiment of the present invention. FIGS. 1 to 3 show an overall structure of the stroller. As shown in FIGS. 1 to 3, the stroller 10 in this embodiment includes a frame part 20 having front legs 22 and rear legs 24, and a handle 50 swingably connected to the frame part 20. Disposed on a lower end of the front leg 22 of the frame part 20 is a caster mechanism for front leg 60 having a front wheel 61. Disposed on a lower end of the rear leg 24 of the frame part 20 is a caster mechanism for rear leg 80 having a rear wheel 81.

In this embodiment, similarly to prevalent strollers (see JP2006-117012A, for example), the stroller 10 is configured to be foldable. In the stroller 10 in this embodiment, it is both possible, by swinging the handle 50 with respect to the frame part 20, to steer the stroller 10 with the baby facing forward in the traveling direction, while an operator (parent) grasps the handle 50 from a back side of the baby, and to steer the stroller 10 with the rear legs of the stroller 10 facing forward in the traveling direction, while the operator grasps the handle from side of the front legs on which the operator faces the baby.

In this specification, the terms "front", "rear", "up", "down", "back and forth direction", and "up and down direction" with respect to the stroller mean, unless otherwise specified, "front", "rear", "up", "down", "back and forth direction", and "up and down direction", with respect to a baby in the unfolded stroller 10. More specifically, the "back and forth direction" of the stroller 10 corresponds to a direction connecting a lower left part and an upper right part in a plane of FIG. 1, and a right and left direction in a plane of each of FIGS. 2 and 3. Unless otherwise specified, the "front" is a side to which the baby in the stroller faces. The lower left side in the plane of FIG. 1 and the left side of the plane of each of FIGS. 2 an 3 correspond to the front side of the stroller 10. The "up and down direction" of the stroller 10 is a direction perpendicular to the back and forth direction, and is a direction perpendicular to the ground on which the stroller 10 rests. Thus, when the ground surface is a horizontal surface, the "up and down direction" represents a vertical direction. The "lateral direction" is a width direction, and is a direction perpendicular both to the "back and forth direction" and the "up and down direction".

At first, as the overall structure of the stroller, the frame part 20 and the handle 50 are described. As shown in FIG. 1, the stroller 10 in this embodiment has substantially a symmetrical structure as a whole, with respect to a lateral center plane along the back and forth direction. As shown in FIGS. 1 to 3, the frame part 20 in this embodiment includes a pair of front legs 22 respectively arranged on the right side and the left side, a pair of rear legs 24 respectively arranged on the right side and the left side, a pair of armrests 28 respectively arranged on the right side and the left side, and a pair of connecting rods (connecting members) 26 respectively arranged on the right side and the left side.

The front legs 22, the rear legs 24, and the connecting rods 26 may be formed of tubular members, for example, pipes made of an aluminum alloy. Meanwhile, the armrests 28 may be formed of a resin, for example. An upper end of each of the front legs 22 is pivotably (swingably) connected to a front portion of the corresponding (right or left) armrest 28. Similarly, an upper end of each of the rear legs 24 is pivotably (swingably) connected to the front portion of the corresponding (right or left) armrest 28. An upper portion of each of the connecting rods 26 is pivotably (swingably) connected to a rear portion of the corresponding (right or left) armrest 28.

The frame part 20 further includes a left lateral side connecting member 32 that connects the left front leg 22 and the left connecting rod 26, and a right lateral side connecting member 32 that connects the right front leg 22 and the right connecting rod 26. A front portion of each of the lateral side connecting members 32 is pivotably connected to an intermediate portion of the front leg 22. A rear portion of each of the lateral side connecting members 32 is pivotably connected to a lower portion of the connecting rod 26. The lateral side connecting member 32 may be formed of a plate member made of an aluminum alloy, for example. The frame part 20 further includes a left bracket 34 that connects the left rear leg 24 and the left connecting rod 26, and a right bracket 26 that connects the right rear leg 24 and the right connecting rod 26. Each of the brackets 34 is pivotably (swingably) connected, at one portion thereof, to an intermediate portion of the rear leg 24, and is pivotably connected, at the other portion thereof, to a lower portion of the connecting rod 26.

As laterally extending constituent elements, the stroller 10 in this embodiment includes a front upper connecting stay 36 and a footrest 38 that connect the pair of front legs 22, and a rear connecting stay 40 that connects the pair of rear legs 24. A bendable guard member 42 connecting the pair of armrests 28 is detachably mounted on the respective armrests 28.

The handle 50 is swingably connected to the frame part as structured above. As shown in FIG. 1, in this embodiment, the handle 50 includes a pair of linear portions 51a extending substantially linearly in parallel with each other, and an intermediate portion 51b that connects the pair of linear portions 51a. The handle 50 generally has a substantially U-shape. Opposed ends of the U-shaped handle 50 are pivotably (swingably) connected to the corresponding brackets 34. A pivot axis line (swing center) of the handle 50 with respect to the brackets 34 corresponds to a pivot axis line of the connecting rod 26 with respect to the bracket 34, and a pivot axis line of the connecting rod 26 with respect to the lateral side connecting member 32. Due to this structure, as shown in FIGS. 2 and 3, the handle 50 can be swung with respect to the frame part 20, and the linear portions 51a of the handle 50 can be moved on the lateral sides of the armrests 28 along the armrests 28.

Switching members 105 are respectively disposed on the pair of linear portions 51a of the handle 50 capable of being moved on the lateral sides of the armrests 28. Each of the switching members 105 is configured to be slidable along the corresponding linear portion 51a. Further, disposed on the intermediate portion 51b of the handle 50 is a remote operation device 53 for remotely operating a sliding movement of the switching members 105.

On the other hand, as shown in FIGS. 2 and 3, each of the armrests 28 is provided with a pair of a first engagement member (first engagement protrusion) 30a and a second engagement member (second engagement protrusion) 30b to be engaged with the switching members 105 for regulating a swinging of the handle 50. Each of the switching members 105 has container parts 105a disposed on a front portion and a rear portion thereof. As shown in the partial sectional view of FIG. 10, a lower end of the container part 105a is opened. Thus, by operating the remote operation device 53 so as to slide the switching members 105 upward while the handle 50 is located on a predetermined position, the engagement between the switching members 105 and the engagement members 30a or the engagement between the switching members 105 and the engagement members 30b can be released. On the other hand, by sliding downward the switching members 105 so that the engagement members 30a or 30b are covered by the container parts 105a from above, the switching members 105 and the engagement members 30a or 30b can be engaged with each other.

As shown in FIG. 3, by engaging the first engagement protrusions 30a on the front side and the switching members 105 to be locked on with each other, the handle 50 is fixed on a first position (face-to-face pushing position) P1. When the handle 50 is fixed on the first position P1, the handle 50 adopts a posture where the handle 50 is inclined forward of the stroller 10 (inclined toward the front leg) from a position (position indicated by the one-dot chain line in FIG. 3) in which the handle 50 is inverted on the pivot axis line (swing center) O1 along the vertical axis when viewed from the lateral side, and the handle 50 is extended substantially in parallel with the rear legs 24. The operator can push and advance the stroller 10, grasping the handle 50 from a position on a side of the front legs 22 of the stroller 10 on which the operator faces the baby. At this time, the rear legs 24 of the stroller 10 face the forward side in the traveling direction.

On the other hand, as shown in FIG. 2, by engaging the second engagement protrusions 30b on the rear side and the switching members 105 to be locked on with each other, the handle 50 is fixed on a second position (backside pushing position) P2. When the handle 50 is fixed on the second position P2, the handle 50 adopts a posture where the handle 50 is inclined rearward of the stroller 10 (inclined toward the rear legs) from a position (position indicated by the one-dot chain line in FIG. 2) in which the handle 50 is inverted on the pivot axis line (swing center) O1 along the vertical axis when viewed from the lateral side, and the handle 50 is extended substantially in parallel with the connecting rod 26. The operator can push and advance the stroller 10 with the baby facing forward in the traveling direction, grasping the handle 50 from a position on a side of the rear legs 24 of the stroller 10, i.e., from a back side of the baby. At this time, the front legs 22 of the stroller 10 face the forward side in the traveling direction.

As described below, in this embodiment, the switching member 105 to be engageable with the first engagement member 30a and the second engagement member 30b functions as a switching mechanism 100 that converts a swinging motion of the handle 50 into a different motion, in order to regulate or deregulate turning of the wheels 61 and 81 of the caster mechanisms 60 and 80.

The stroller 10 having the overall structure as described above can be folded by rotating the respective constituent members. To be specific, by pulling upward the handle 50 positioned on the second position P2 at first, and then by pushing downward the handle 50, the bracket 34 is rotated clockwise in FIG. 2 relative to the rear leg 24. In accordance with this operation, the armrest 28 and the lateral side connecting member 32 are rotated clockwise in FIG. 2 relative to the connecting rod 26. By means of these operations, the handle 50 and the front leg 22 become substantially in parallel with each other when viewed from the lateral side, and the position of the handle 50 can be lowered. In this manner, the stroller 10 can be folded, so that the dimensions of the stroller can be reduced in the back and forth direction and in the up and down direction. On the other hand, in order to unfold the folded stroller 10, the above folding steps are reversely performed.

Figure 4:
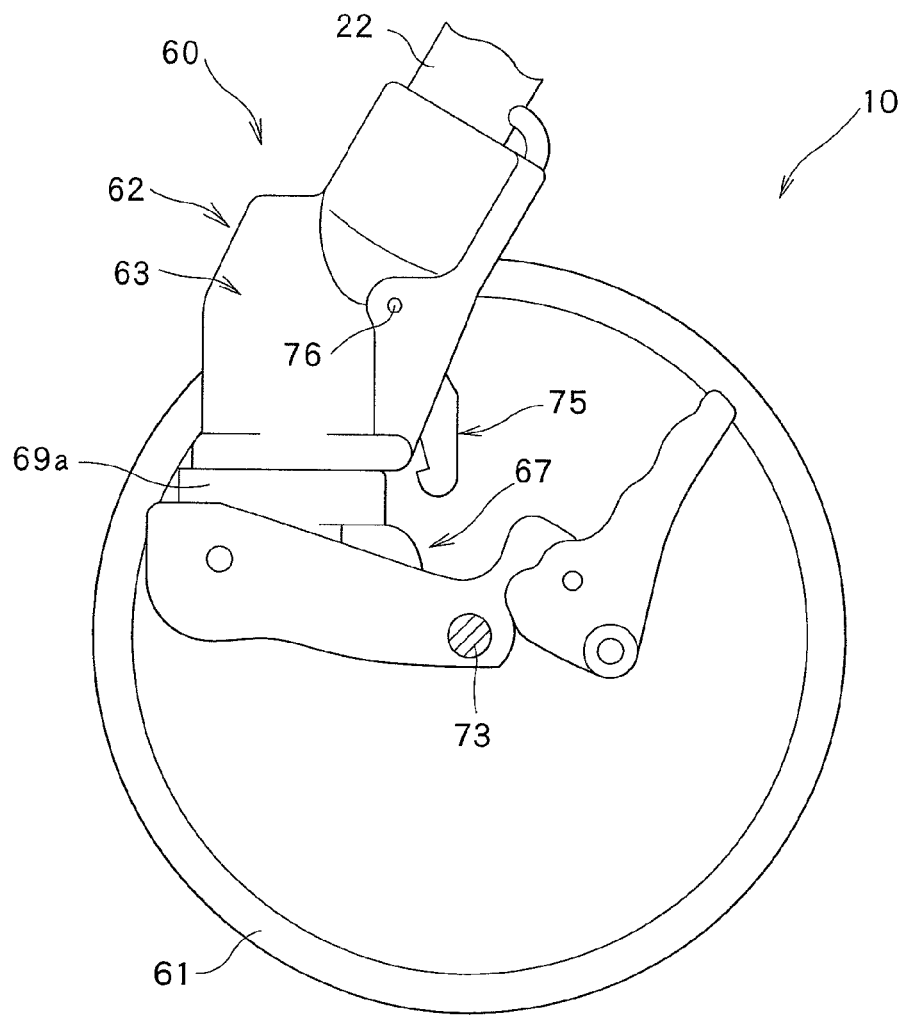
FIG. 4 is a side view showing a caster mechanism for front leg.
Figure 5:
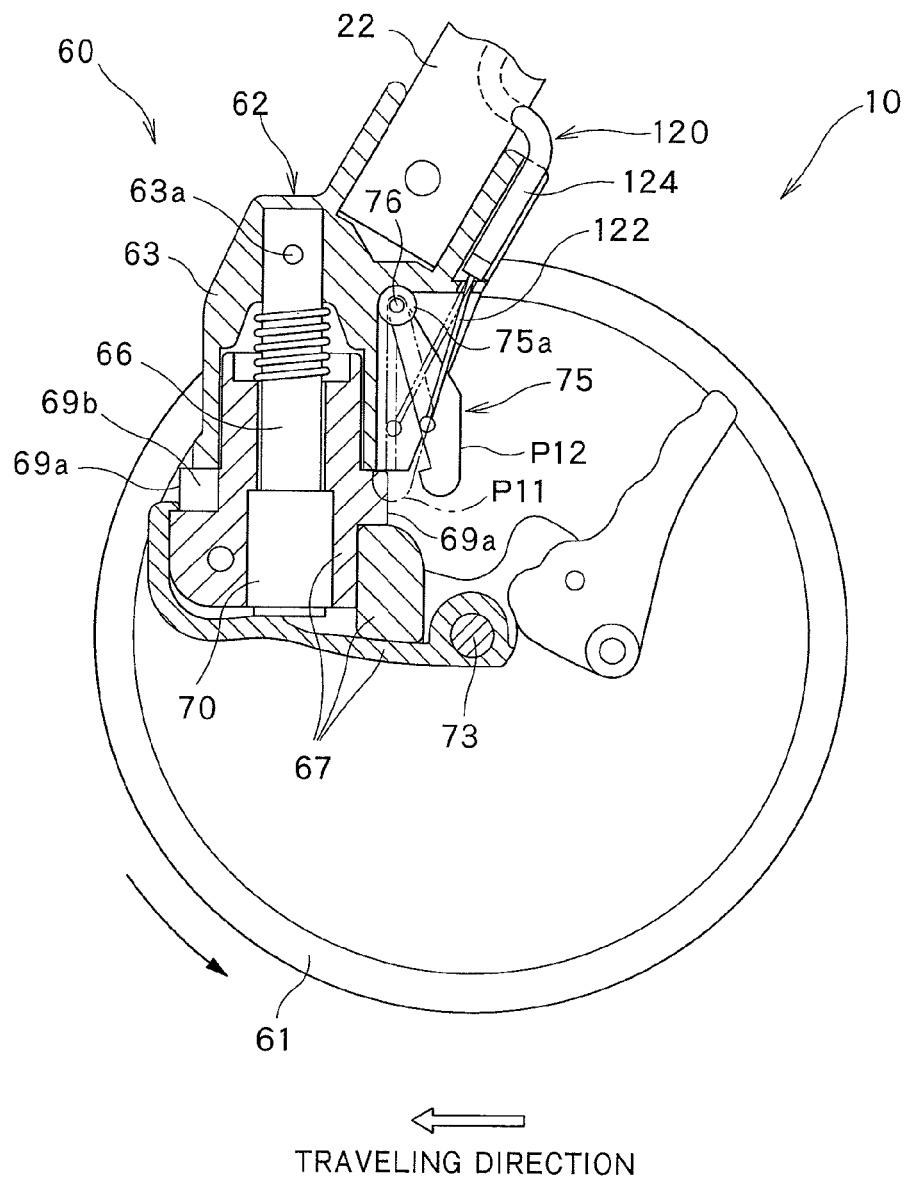
FIG. 5 is a longitudinal sectional view of the caster mechanism for front leg shown in FIG. 4, with a locking member being arranged on an unlocking position.
Figure 6:
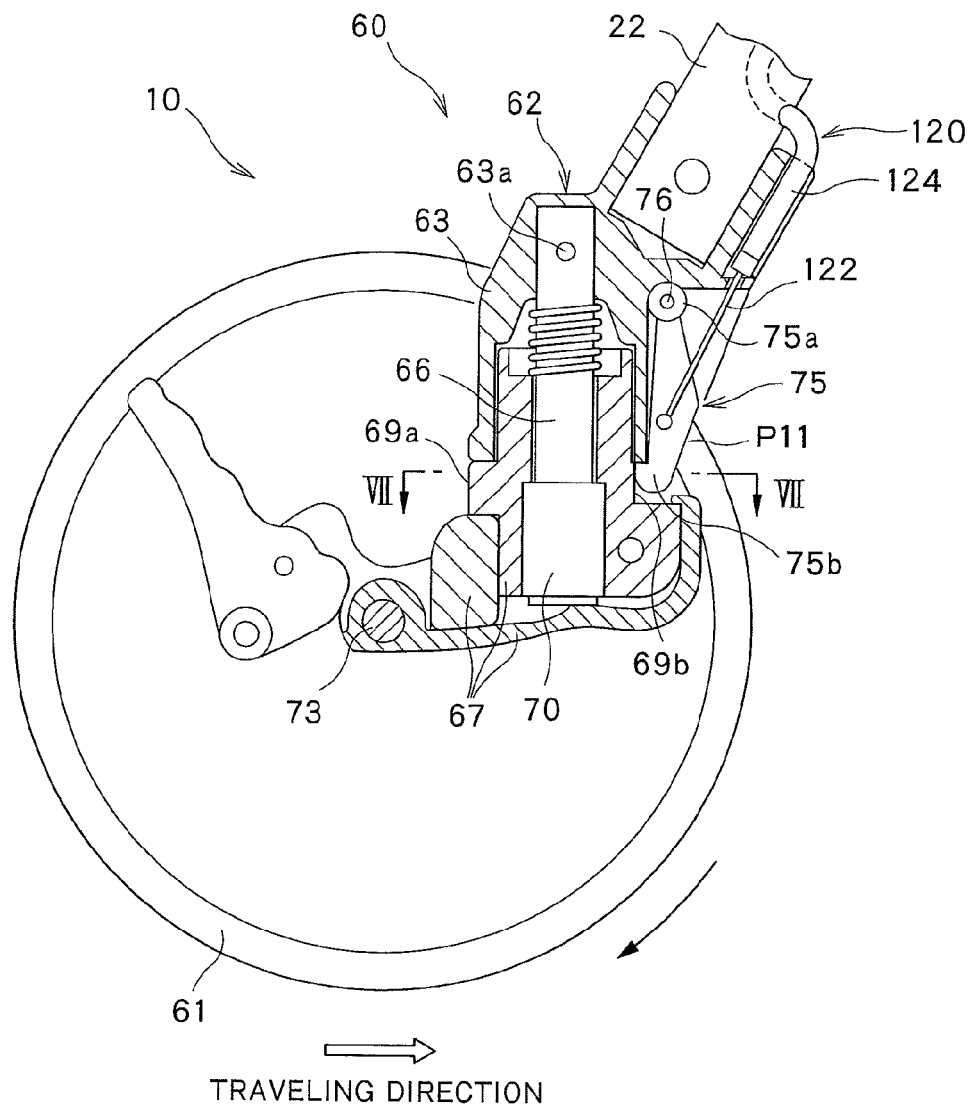
FIG. 6 is a longitudinal sectional view corresponding to FIG. 5, with the locking member being located on a locking position.

Next, the caster mechanism for front leg 60 is described with reference to FIGS. 4 to 7. As described above, the caster mechanisms for front leg 60 are disposed on the respective lower ends of the pair of front legs 22. The two caster mechanisms for front leg 60 have the same structure. As shown in FIGS. 4 to 6, the caster mechanism 60 includes: a front wheel (wheel) 61; a wheel holder 62 that holds the front wheel 61 rotatably and turnably with respect to the back and forth direction of the stroller 10; and a locking member 75 disposed on the wheel holder 62, and capable of being moved between a locking position P11 for regulating the turning of the wheel 61, and an unlocking position P12 for enabling the turning of the wheel 61.

As shown in FIGS. 5 and 6, the wheel holder 62 includes: a base part 63 fixed on the front leg 22; a shaft member 66 fixed on the base part 63 through a pin 63*a*; and a holding part 67 connected to the shaft member 66. The shaft member 66 is extended substantially perpendicularly to the ground on which the unfolded stroller 10 rests. The holding part 67 is rotatably supported on the shaft member 66 through a bearing 70 (see FIG. 5). In addition, the holding part 67 rotatably holds the front wheel 61 through a rotary shaft 73. In this caster mechanism 60, when the holding part 67 is rotated with respect to the shaft member 66, the wheel 61 can be turned with respect to the back and forth direction of the stroller 10.

The rotary shaft 73 is laterally extended at a position displaced from the axis line of the shaft member 66 along the back and forth direction of the stroller 10. Thus, when the stroller 10 is steered, the front wheels 61 can be turned with respect to the back and forth direction of the stroller 10, such that the axis line of the shaft member 66 is positioned forward of the rotary shaft 73 in the traveling direction. FIG. 5 shows the caster mechanism 60 when the stroller 10 is steered with the front leg 22 facing forward in the traveling direction, and FIG. 6 shows the caster mechanism 60 when the stroller 10 is steered with the rear leg 24 facing forward in the traveling direction. In FIGS. 4 to 6, illustration of one of the front wheels 61 is omitted.

As shown in FIGS. 5 and 6, the base part 63 is provided with the locking member 75 serving as locking means. One end 75*a* of the locking member 75 is connected to the base part 63 through a pin 76. The locking member 75 is swingable relative to the base part 63 about the pin 76. As shown in FIGS. 5 and 6, the locking member 75 can be moved between the locking position P11 at which the locking member 75 is engaged with the holding part 67, and the unlocking position P12 at which the locking member 75 is not engaged with the holding part 67.

Figure 7:
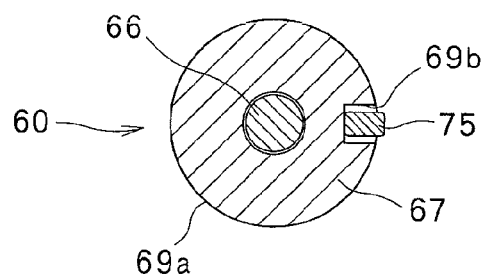
FIG. 7 is a sectional view taken along the line VII-VII in FIG. 6.

As clearly shown in FIGS. 6 and 7, a part of the holding part 67 to be engaged with the locking member 75 is formed to have a substantially cylindrical shape. As shown in FIG. 7, a recess 69*b* for receiving the locking member 75 is formed in a part of a cylindrical outer circumferential surface 69*a*. The locking position P11 of the locking member 75 is a position where the locking member 75 is fitted in the recess 69*b* so as to regulate the rotation of the holding part 67 relative to the locking member 75 and the shaft member 66. In this structure, when the locking member 75 is located on the locking position P11, the turning motion of the front wheel 61 with respect to the back and forth direction of the stroller 10 is regulated. Hereafter, the state in which the turning motion of the wheel is regulated is also referred to simply as "locking condition". The locking member 75 is urged by a torsion spring, not shown, from the unlocking position P12 toward the locking position P11.

Figure 8:
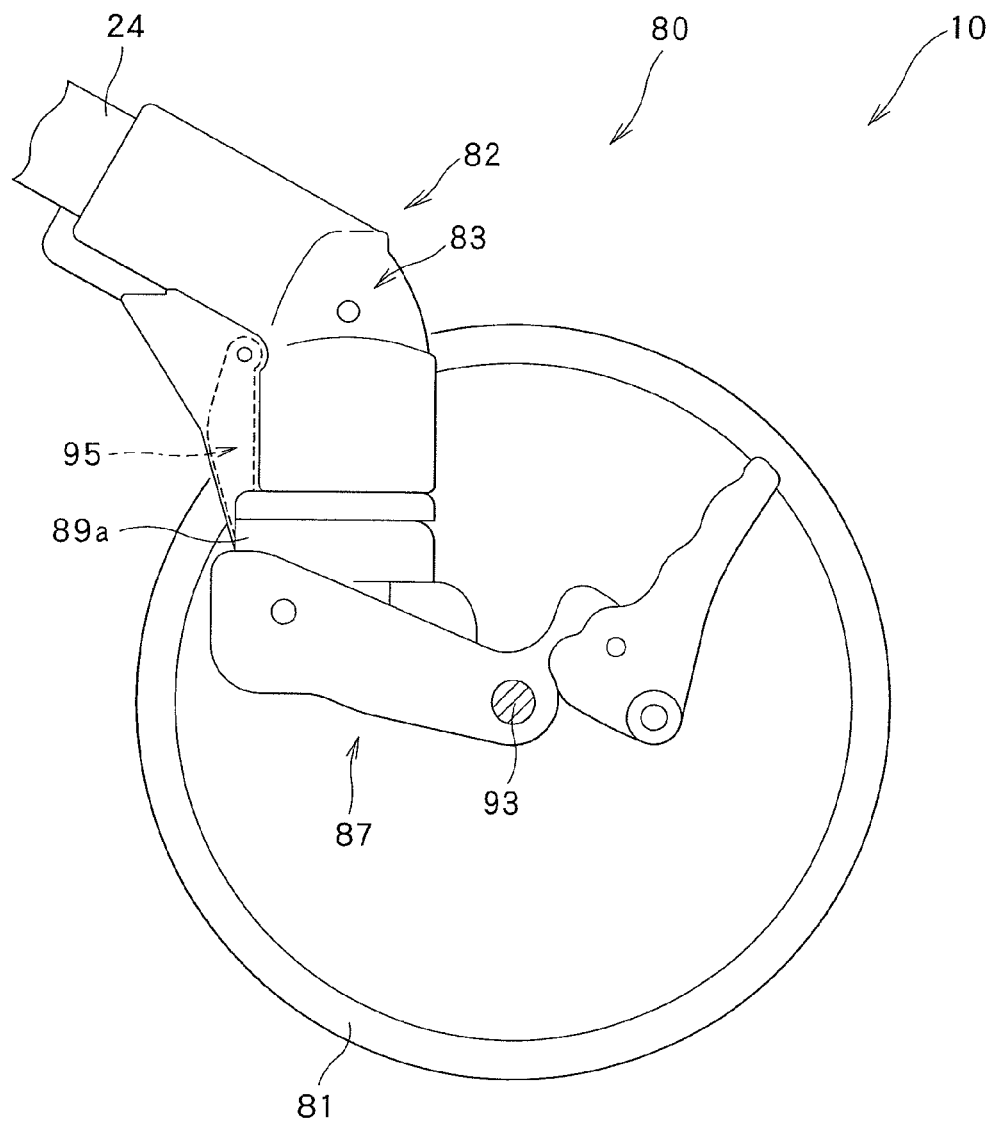
FIG. 8 is a side view of a caster mechanism for rear leg.
Figure 9:
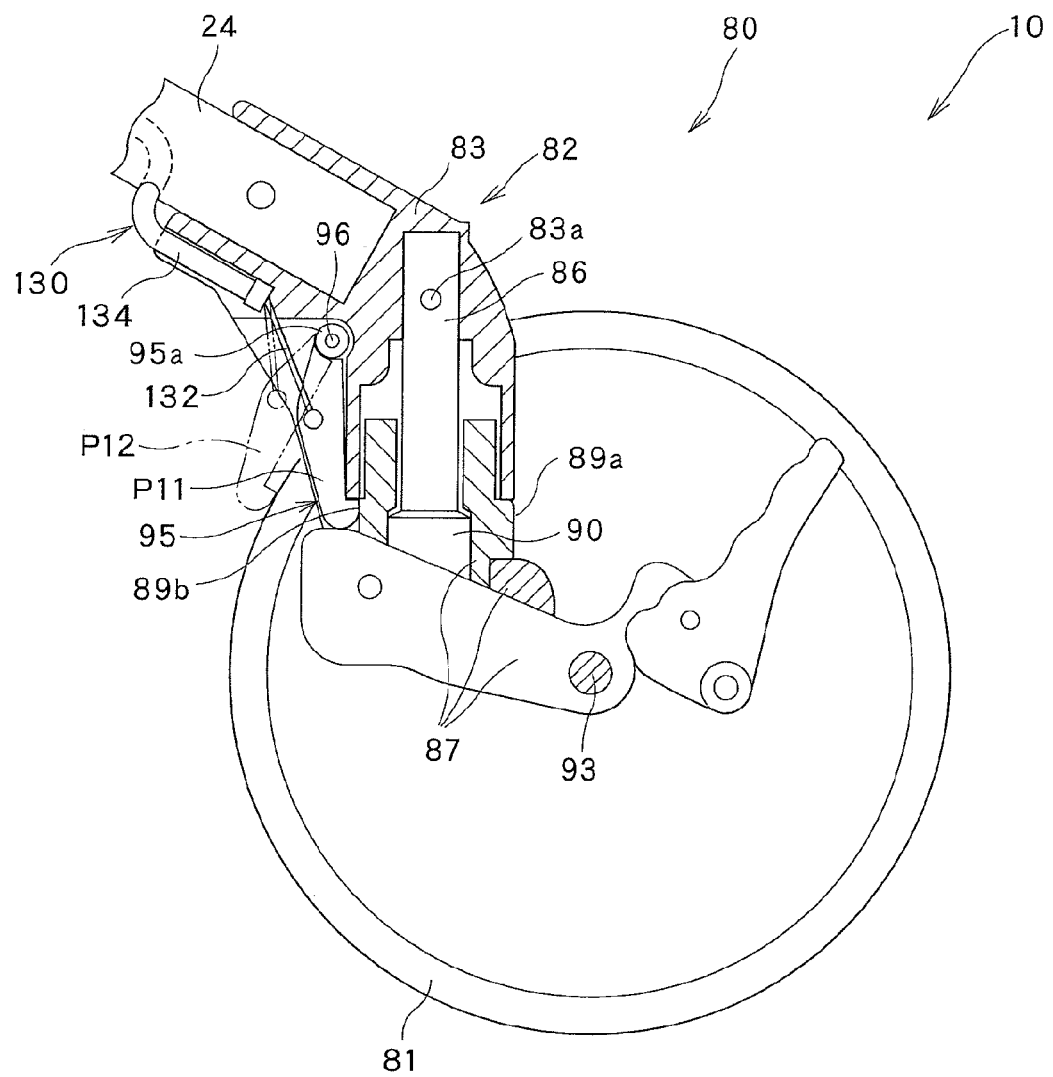
FIG. 9 is a longitudinal sectional view of the caster mechanism for rear leg shown in FIG. 8, with a locking member being arranged on a locking position.

Next, with reference to FIGS. 8 and 9, there are described the caster mechanisms for rear leg 80 disposed on the respective lower ends of the pair of rear legs 24. The two caster mechanisms for rear leg 80 have the same structure. In addition, the caster mechanism for rear leg 80 has substantially the same structure as that of the caster mechanism for front leg 60. Namely, as shown in FIGS. 8 and 9, the caster mechanism 80 includes: a rear wheel (wheel) 81; a wheel holder 82 that holds the rear wheel 81 rotatably and turnably with respect to the back and forth direction of the stroller 10; and a locking member 95 disposed on the wheel holder 82, and capable of being moved between a locking position P11 for regulating the turning of the wheel 81, and an unlocking position P12 for enabling the turning of the wheel 81. As shown in FIG. 9, the wheel holder 82 includes: a base part 83 fixed on the rear leg 24; a shaft member 86 fixed on the base part 83 through a pin 83*a*, the shaft member 86 being extended substantially perpendicularly to the ground on which the unfolded stroller 10 rests; and a holding part 87 rotatably supported on the shaft member 86 through a bearing 90. In addition, the holding part 87 rotatably holds the rear wheel 81 through a rotary shaft 93. The shaft 93 is laterally extended at a position displaced from the axis line of the shaft member 86 along the back and forth direction of the stroller 10.

As shown in FIG. 9, the base part 83 is provided with the locking member 95 serving as locking means. One end 95*a* of the locking member 95 is connected to the base part 83 through a pin 96. The locking member 95 is swingable relative to the base part 83 about the pin 96. As shown in FIG. 9, the locking member 95 can be moved between the locking position P11 at which the locking member 95 is engaged with the holding part 87, and the unlocking position P12 at which the locking member 95 is not engaged with the holding part 87.

Similarly to the caster mechanism for front leg 60, a part of the holding part 87 to be engaged with the locking member 95 is formed to have a substantially cylindrical shape. A recess 89*b* for receiving the locking member 95 is formed in a part of a cylindrical outer circumferential surface 89*a*. The locking position P11 of the locking member 95 is a position where the locking member 95 is fitted in the recess 89*b* so as to regulate the rotation of the holding part 87 relative to the shaft member 86. The locking member 95 is urged by a torsion spring, not shown, from the unlocking position P12 toward the locking position P11.

Next, the switching mechanism 100 is described. As described above, the switching mechanism 100 is a mechanism that converts a swinging motion of the handle 50 into a different motion, in order to regulate or deregulate turning of the wheels 61 and 81 of the caster mechanisms 60 and 80. In this embodiment, the switching mechanism 100 includes switching members 105 slidably disposed on the linear portions 51*a* of the handle 50.

Figure 10:
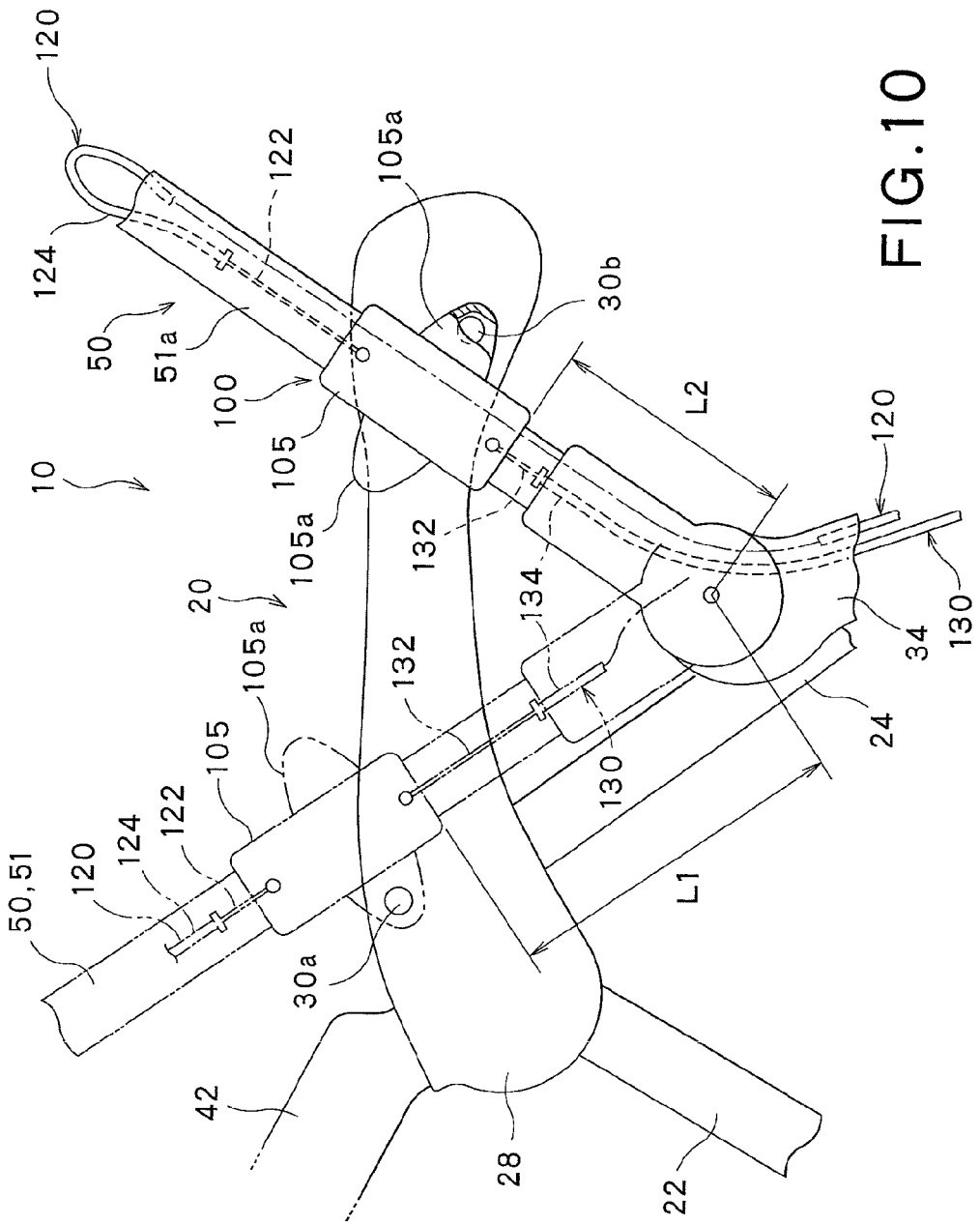
FIG. 10 is a partial side view of the stroller for explaining a switching mechanism.

As shown in FIG. 10, when the switching member 105 is engaged with the first engagement member 30*a* disposed on the front side of the armrest 28, the switching member 105 is held on a first holding position P21 on the linear portion 51*a* of the handle 50. Meanwhile, when the switching member 105 is engaged with the second engagement member 30b disposed on the rear side of the armrest 28, the switching member 105 is held on a second holding position P22 on the linear portion 51a of the handle 50. As described above, when the switching member 105 is engaged with the first engagement protrusion 30a so as to be held on the first holding position P21, the handle 50 is located on the first position P1 with its swinging movement from the first position P1 being regulated. Similarly, when the switching member 105 is engaged with the second engagement protrusion 30b so as to be held on the second holding position P22, the handle 50 is located on the second position P2 with its swinging movement from the second position P2 being regulated.

As shown in FIG. 10, the first holding position P21 and the second holding position P22 are positions different from each other on the handle 50. In this embodiment, the switching member 105 is slidable on the linear portion 51a of the handle 50 in a longitudinal direction of the linear portion 51a. In addition, as shown in FIG. 10, a distance between the switching member 105 and the swing center O1 of the handle 50 along the longitudinal direction of the linear portion 51a of the handle 50 differs depending on whether the switching member 105 is located on the first holding position P21 (two-dot chain line in FIG. 10), or the switching member 105 is located on the second holding position (solid line in FIG. 10). Namely, in FIG. 10, the distance in the former case is shown as L1, and the distance in the latter case is shown as L2.

In more detail, the distance L1 which is a distance between the switching member 105 and the swing center O1 of the handle 50 relative to the frame part 20, along the longitudinal direction of the linear portion 51a of the handle 50, when the switching member 105 is held on the first position P21, is longer than the distance L2 which is a distance between the switching member 105 and the swing center O1 of the handle 50 relative to the frame part 20, along the longitudinal direction of the linear portion 51a of the handle 50, when the switching member 105 is held on the second position P22. That is to say, when the handle 50 is located on the first position P1, the switching member 105 is held on a position that is more distant from the swing center O1, i.e., on a higher position, as compared with the case in which the handle 50 is located on the second position P2.

A spring, not shown, is disposed in the linear portion 51a of the handle 50. The switching member 105 is urged by the spring such that the switching member 105 is slid on the linear portion 51a of the handle 50 in a direction close to the swing center O1 of the handle 50. Thus, when the remote operation device 53 disposed on the intermediate portion 51b of the handle 50 is operated, the switching member 105 is actuated against the urging force from the spring in the handle 50.

Next, transmission mechanisms 120 and 130 are described. Between the switching mechanisms 100 and the caster mechanisms 60 and 80, there are disposed transmission mechanisms (transmission means) configured to transmit an actuation of the switching mechanism 100 to the caster mechanisms. In this embodiment, two first transmission mechanisms 120 are respectively disposed between the left caster mechanism for front leg 60 and the switching mechanism 100, and between the right caster mechanism for front leg 60 and the switching mechanism 100. The two first transmission mechanisms 120 have the same structure. In addition, two second transmission mechanisms 130 are respectively disposed between the left caster mechanism for rear leg 80 and the switching mechanism 100, and between the right caster mechanism for rear leg 80 and the switching mechanism 100. The two second transmission mechanisms 130 have the same structure.

The transmission mechanism 120 is configured to transmit, to the locking member 75, the movement of the switching member 105 between the first holding position P21 and the second holding position P22, so that the locking member 75 is moved from the unlocking position P12 to the locking position P11, or from the locking position P11 to the unlocking position P12. Similarly, the transmission mechanism 130 is configured to transmit, to the locking member 95, the movement of the switching member 105 between the first holding position P21 and the second holding position P22, so that the locking member 95 are moved from the unlocking position P12 to the locking position P11, or from the locking position P11 to the unlocking position P12. In this embodiment, the first transmission mechanism 120 and the second transmission mechanism 130 have the same structure, although the location thereof are different from each other.

The first transmission mechanism 120 includes a lead wire 122 whose opposed ends are respectively fixed to the switching member 105 of the switching mechanism 100 and the locking member 75 of the caster mechanism 60, and a tubular member 124 through which the lead wire 122 passes. Similarly, the second transmission mechanism 130 includes a lead wire 132 whose opposed ends are respectively fixed to the switching member 105 of the switching mechanism 100 and the locking member 95 of the caster mechanism 80, and a tubular member 134 through which the lead wire 132 passes. As shown in FIGS. 5, 6, 9 and 10, opposed ends of the tubular member 124 are fixed on the linear portion 51a of the handle 50 and the base part 63 of the caster mechanism 60, and opposed ends of the tubular member 134 are fixed on the linear portion 51a of the handle 50 and the base part 83 of the caster mechanism 80. In such a structure, the lead wires 122 and 132 are moved relative to the tubular members 124 and 134, in conjunction with the sliding movements of the switching members 105 relative to the handle 50, as well as the swinging movements of the locking members 75 and 95 relative to the base parts 63 and 83 in the caster mechanisms 60 and 80.

To be specific, as shown in FIG. 10, a position on the handle 50, to which the one end of the tubular member 124 of the first transmission mechanism 120 is fixed, is higher than the position at which the switching member 105 held on the first holding position P21 is located. Namely, a distance between the one end of the tubular member 124 of the first transmission mechanism 120 and the swing center O1 of the handle 50 is longer than a distance between the switching member 105, to which the end of the lead wire 122 extending from the one end of the tubular member 124 is fixed, and the swing center O1 of the handle 50.

Thus, when the switching member 105 is slid downward on the linear portion 51a of the handle 50 so as to come close to the swing center O1 of the handle 50, i.e., when the switching member 105 is moved from the first holding position 21 toward the second holding position P22, the lead wire 122 of the first transmission mechanism 120 is, in accordance with the movement of the switching member 105, drawn outside the tubular member 124 of the first transmission mechanism 120 from the end of the tubular member 124 on the side of the switching mechanism 100, and is drawn into the tubular member 124 of the first transmission mechanism 120 from the end of the tubular member 124 on the side of the caster mechanism for front leg 60. As a result, the locking member 75 of the caster mechanism for front leg 60, to which the end of the lead wire 122 on the side of the caster mechanism for front leg 60 is connected, is moved from the locking position P11 toward the unlocking position P12 (see FIG. 5).

Reversely, when the switching member 105 is slid upward on the linear portion 51a of the handle 50 so as to come away from the swing center O1 of the handle 50, i.e., when the switching member 105 is moved from the second holding position P22 toward the first holding position P21, the lead wire 122 of the first transmission mechanism 120 is, in accordance with the movement of the switching member 105, pushed into the tubular member 124 of the first transmission mechanism 120 from the end of the tubular member 124 on the side of the switching mechanism 100, and is pushed outside the tubular member 124 of the first transmission mechanism 120 from the end of the tubular member 124 on the side of the caster mechanism for front leg 60. As a result, the locking member 75 of the caster mechanism for front leg 60, to which the end of the lead wire 122 on the side of the caster mechanism for front leg 60, can be moved from the unlocking position P12 toward the locking position P11.

On the other hand, as shown in FIG. 10, a position on the handle 50, to which the one end of the tubular member 134 of the second transmission mechanism 130 is fixed, is lower than the position at which the switching member 105 held on the second holding position P22 is located. Namely, a distance between the one end of the tubular member 134 of the second transmission mechanism 130 and the swing center O1 of the handle 50 is shorter than a distance between the switching member 105, to which the end of the lead wire 132 extending from the tubular member 134 is fixed, and the swing center O1 of the handle 50.

Thus, when the switching member 105 is slid downward on the linear portion 51a of the handle 50 to come close to the swing center O1 of the handle 50, i.e., when the switching member 105 is moved from the first holding position P21 toward the second holding position P22, the lead wire 132 of the second transmission mechanism 130 is, in accordance with the movement of the switching member 105, pushed into the tubular member 134 of the second transmission mechanism 130 from the end of the tubular member 134 on the side of the switching mechanism 100, and is pushed outside the tubular member 134 of the second transmission mechanism 130 from the end of the tubular member 134 on the side of the caster mechanism for rear leg 80. As a result, the locking member 95 of the caster mechanism for rear leg 80, to which the end of the lead wire 132 on the side of the caster mechanism for rear leg 80 is connected, can be moved from the unlocking position P12 toward the locking position P11.

Reversely, when the switching member 105 is slid upward on the linear portion 51a of the handle 50 so as to come away from the swing center O1 of the handle 50, i.e., when the switching member 105 is moved from the second holding position P22 toward the first holding position P21, the lead wire 132 of the second transmission mechanism 130 is, in accordance with the movement of the switching member 105, drawn outside the tubular member 134 of the second transmission mechanism 130 from the end of the tubular member 134 on the side of the switching mechanism 100, and is drawn into the tubular member 134 of the second transmission mechanism 130 form the end of the tubular member 134 on the side of the caster mechanism for rear leg 80. As a result, the locking member 95 of the caster mechanism for rear leg 80, to which the end of the lead wire 132 on the side of the caster mechanism for rear leg 80 is connected, can be moved from the locking position P11 toward the unlocking position P12.

The force of the spring (not shown), which is disposed in the handle 50, urging the switching member 105 toward the swing center O1 of the handle 50 is greater than the forces of the torsion springs (not shown), which are disposed on the caster mechanisms 60 and 80, for swinging the respective locking members 75 and 95 so as to draw out the lead wires 122 and 132 toward the caster mechanisms 60 and 80. When no external force is applied to the switching mechanism 100, the locking member 75 of the caster mechanisms for front wheel 60 is adapted to be located on the unlocking position P12, and the locking member 95 of the caster mechanism for rear leg 80 is adapted to be located on the locking position P11.

In the illustrated example, the lead wire 122 and the tubular member 124, which constitute the first transmission mechanism 120, are passed through the inside of the handle 50, then supported on an outer surface of the lateral side connecting member 32, and are extended up to the caster mechanism for front leg 60 through inside of the front leg 22. On the other hand, the lead wire 132 and the tubular member 134, which constitute the second transmission mechanism 130, are passed through the inside of the handle 50 and then extended up to the caster mechanism for rear leg 80 through the inside of the rear leg 24. However, these routes of the first transmission mechanism 120 and the second transmission mechanism 130 are mere examples. The switching mechanism 100 and the caster mechanism 60, and the switching mechanism 100 and the caster mechanism 80 may be connected to each other through various other routes. For example, the first transmission mechanisms 120 and 130 may not be passed through the inside of the handle 50 and the insides of the front leg 22 and the rear leg 24, but may be supported on an outer surface of the handle 50 and outer surfaces of the front leg 22 and the rear leg 24. Alternatively, the first transmission mechanism 120 may be extended from the switching mechanism 100 up to the caster mechanism for front leg 60, via the handle 50, the rear leg 24, the arm rest 28 and the front leg 22, in this order.

Next, there is described an operation of the stroller 10 as structured above, when the handle 50 is swung.

As described above, by engaging the switching members 105 with the first engagement members 30a disposed on the front sides of the armrests 28, the handle 50 can be fixed on the first position P1 (see FIG. 3) in which the handle 50 is inclined toward the front legs. In this state, a parent can steer the stroller 10 with the rear legs 24 of the stroller 10 facing the forward side in the traveling direction, grasping the handle 50 located on the first position P1 from the side of the front legs 22 of the stroller 10. Alternatively, by engaging the switching members 105 with the second engagement members 30b disposed on the rear sides of the armrests 28, the handle 50 can be fixed on the second position (see FIG. 2) in which the handle 50 is inclined toward the rear legs. In this state, the parent can steer the stroller 10 with the front legs 22 of the stroller 10 facing the forward side in the traveling direction, grasping the handle 50 located on the second position P2 from the side of the rear legs 24 of the stroller 10.

In this embodiment, each switching member 105 of the switching mechanism 100 disposed on the handle 50 is held on the first holding position P21 when the handle 50 is located on the first position P1, and is held on the second holding position P22 when the handle 50 is located on the second position P2.

As described above, when the handle 50 is inclined forward so that the switching member 105 is held on the first holding position P21, the lead wire 122 of the first transmission mechanism 120 is moved from the side of the switching mechanism 100 to the side of the caster mechanism for front leg 60, while the lead wire 132 of the second transmission mechanism 130 is moved from the side of the caster mechanism for rear leg 80 to the side of the switching mechanism 100. As a result, the locking member 75 of the caster mechanism for front leg 60 is located on the locking position P11, whereby the front wheel 61 is maintained in the unturnable condition with respect to the back and forth direction. Reversely, the locking member 95 of the caster mechanism for rear leg 80 is located on the unlocking position P12, whereby the rear wheel 81 is maintained in the turnable condition with respect to the back and forth direction.

On the other hand, when the handle 50 is inclined rearward so that the switching member 105 is held on the second holding position P22, the lead wire 122 of the first transmission mechanism 120 is moved from the side of the caster mechanism for front leg 60 to the side of the switching mechanism 100, while the lead wire 132 of the second transmission mechanism 130 is moved from the side of the switching mechanism 100 to the side of the caster mechanism for rear leg 80. As a result, the locking member 75 of the caster mechanism for front leg 60 is located on the unlocking position P12, whereby the front wheel 61 is maintained in the turnable condition with respect to the back and forth direction. Reversely, the locking member 95 of the caster mechanism for rear leg 80 is located on the locking position P11, whereby the rear wheel 81 is maintained in the unturnable condition with respect to the back and forth direction.

In both cases where the stroller 10 is moved with the front legs 22 or the rear legs 24 facing forward in the traveling direction, it is preferable that, from the view point of manipulability and traveling stability, the wheels facing the forward side in the traveling direction are turnable with respect to the back and forth direction, and that the wheels facing the rearward side in the traveling direction are regulated from turning with respect to the back and forth direction. According to the stroller 10 in this embodiment, in accordance with the position of the handle 50, the wheels 61 and 81 of the caster mechanisms for front leg 60 and the caster mechanisms for rear leg 80 can be automatically switched into the turnable condition or the unturnable condition, in a stable and reliable manner.

According to the above embodiment, depending on whether the handle 50 is located on the first position P1 or the handle 50 is located on the second position P2, each switching member 105 of the switching mechanism 100 is held on the different positions. By utilizing the change in position of the switching member 105, the turnings of the wheels 61 and 81 of the respective caster mechanisms 60 and 80 are automatically controlled. In particular, the switching member 105 is linearly moved (in particular, along a straight line). By transmitting such a movement of the switching member 105 to the caster mechanism for front leg 60 and the caster mechanism for rear leg 80 through the transmission mechanisms, the wheels 61 and 81 can be switched into the turnable condition or the unturnable condition, in a stable and reliable manner.

In addition, since the switching member 105 is engaged with the first engagement protrusion 30a or the second engagement protrusion 30b, which are provided on the frame part 20, the switching member 105 is necessarily located on the predetermined position, when the handle 50 is located on the first position P1 or the second position P2. Since the locking members 75 and 95 of the caster mechanism for front leg 60 and the caster mechanism for rear leg 80 are operated in accordance with the locations of the switching member 105, the wheels 61 and 81 can be switched into the turnable condition or the unturnable condition, in a stable and reliable manner.

Further, the switching member 105 of the switching mechanism 100 is a member also serving to fix the handle 50 on the first position P1 or on the second position P2. Thus, the number of components can be reduced, as compared with a case in which an additional switching member is provided as the switching mechanism. In addition, since the configuration of the stroller 10 can be simplified with the lesser number of components, the wheels 61 and 81 of the caster mechanisms for front leg 60 and the caster mechanisms for rear leg 80 can be switched into the turnable condition or the unturnable condition, in a stable and reliable manner.

The aforementioned embodiment can be variously modified, within the scope of the present invention.

Hereafter, an example of modification will be described.

In the above embodiment, when the switching member 105 is located on the first holding position P21, the switching member 105 is located on the position that is more distant from the swing center O1 of the handle 50, as compared with the case in which the switching member 105 is located on the second holding position P22. However, not limited thereto, when the switching member 105 is located on the first holding position P21, the switching member 105 may be located on a position that is closer to the swing center O1 of the handle 50, as compared with the case in which the switching member 105 is located on the second holding position P22. In addition, in the above embodiment, the end of the first transmission mechanism 120 on the side of the switching mechanism 100 is positioned above the switching member 105, and the end of the second transmission mechanism 130 on the side of the switching mechanism 100 is positioned below the switching member 100. However, not limited thereto, the present invention can be variously modified. Also in these modified examples, in accordance with the swinging movement of the handle 50, the turning of the wheel of the caster mechanism facing rearward in the traveling direction can be automatically regulated, and the turning of the wheel of the caster mechanism facing forward in the traveling direction can be automatically enabled.

Figure 11:
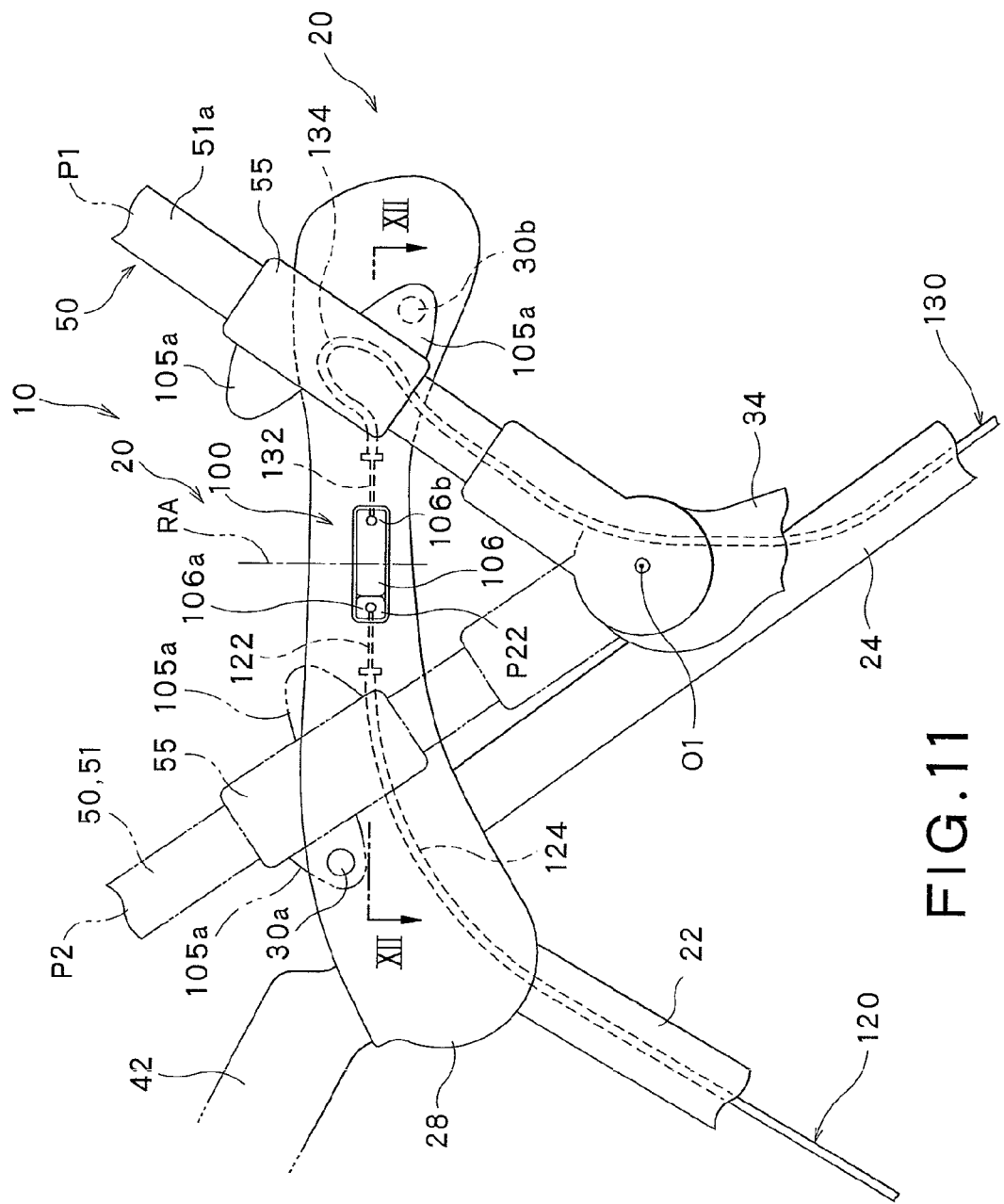
FIG. 11 is a view corresponding to FIG. 10, for explaining a modification of the switching mechanism.
Figure 12:
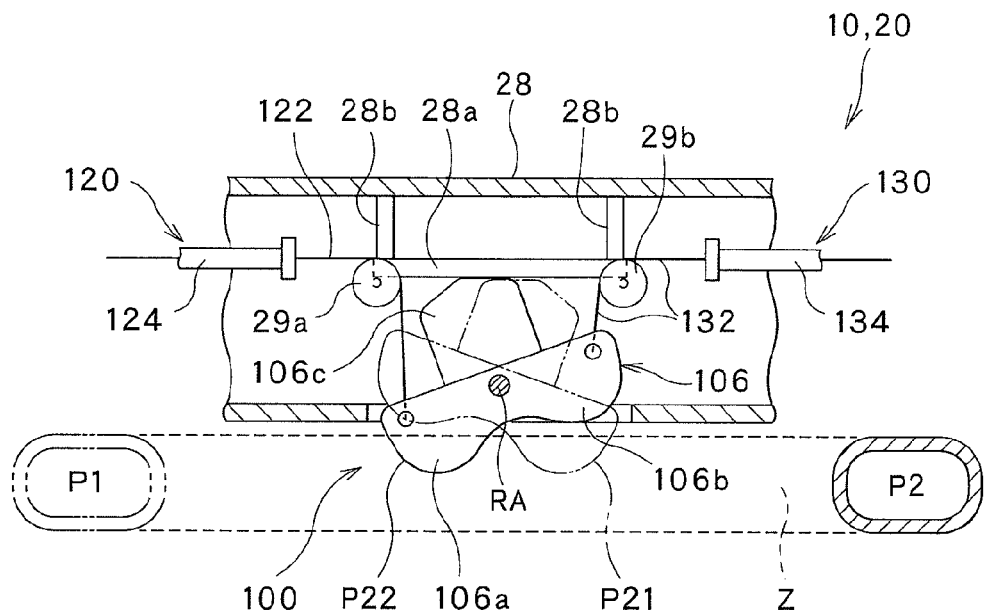
FIG. 12 is a sectional view taken along the line XII-XII in FIG. 11.
Figure 13:
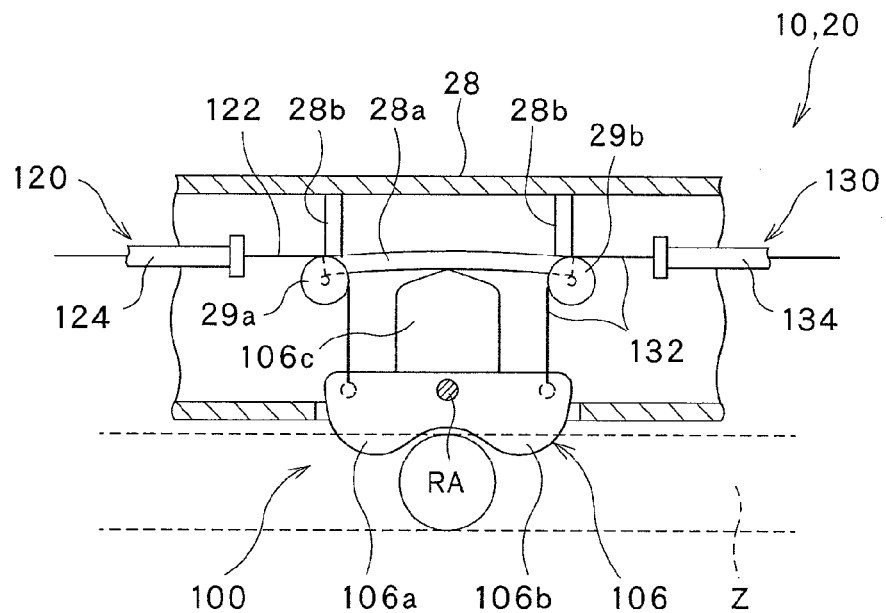
FIG. 13 is a view corresponding to FIG. 12, showing a switching member located on a position different from the position shown in FIG. 12.

In the above embodiment, although the member for fixing the handle 50 on the first position P1 or on the second position P2 also serves as the switching member 105 of the switching mechanism 100, the present invention is not limited thereto. For example, as shown in FIGS. 11 to 13, in addition to a sliding member 55 for fixing the handle 50 on the first position P1 or on the second position P2, a switching member of a switching mechanism 100 may be provided. In the example shown in FIGS. 11 to 13, the sliding member 55 has the same structure as that of the switching member 105 described in the aforementioned embodiment, except that the transmission means is not connected to the sliding member. In FIGS. 11 to 13, the structures corresponding to the structures in the above-described embodiment are shown by the same reference numbers.

In the example shown in FIGS. 11 to 13, a switching member 106 is pivotably supported on a frame part 50. The switching member 106 has projecting parts 106a and 106b that are projectable in a trajectory zone Z of the handle 50, which is defined when the handle 50 is swung (i.e., a range through which the handle 50 is passed). The projecting parts 106a and 106b are configured to come into contact with the handle 50 during its swinging movement. In particular, in the illustrated example, the switching member 106 is pivotably supported in the armrest 28, such that the projecting parts 106a and 106b can project from the armrest 28. As shown in FIGS. 12 and 13, the switching member 106 has a symmetrical shape, and has the two projecting parts, i.e., the first projecting part 106a and the second projecting part 106b.

A pivot axis RA of the switching member 106 is extended substantially in parallel with an imaginary plane including a movement trajectory of a part of the handle 50, which is capable of coming into contact with the projecting parts 106a and 106b, when the handle 50 is swung. Thus, during the movement of the handle 50 from the first position P1 toward the second position P2 or from the second position P2 to the first position P1, the handle 50 presses the projecting part 106a or 106b of the switching member 106, so that the switching member 106 can be swung between a first holding position P21 and a second holding position P22.

As shown by the solid line in FIG. 12, when the switching member 106 is held on the second holding position P22, the first projecting part 106a projects from the armrest 28 so as to be located within the trajectory zone Z of the handle 50, which is defined when the handle 50 is swung. On the other hand, the second projecting part 106b is extended substantially on the same plane with the outer surface of the armrest 28, and thus does not project in the trajectory zone Z of the handle 50, which is defined when the handle 50 is swung. Thus, when the handle 50 is moved from the second position P2 (solid line) toward the first position P1 (two-dot chain line), the handle 50 passes through a position facing the pivot axis RA and then collides with the first projecting part 106a so as to press the first projecting part 106a (see, FIG. 13), without coming into contact with the second projecting part 106b that is located on upstream side of the first projecting part 106a along the movement path of the handle 50. Since the handle 50 presses the first projecting part 106a, the switching member 106 is moved from the second holding position P22 (solid line) toward the first holding position P21 (two-dot chain line).

Reversely, as shown by the two-dot chain line in FIG. 12, when the switching member 106 is held on the first holding position P21, the first projecting part 106a is extended substantially on the same plane with the outer surface of the armrest 28, and thus does not project in the trajectory zone Z of the handle 50, which is defined when the handle 50 is swung. On the other hand, the second projecting part 106b projects from the armrest 28 so as to be located within the trajectory zone Z of the handle 50, which is defined when the handle 50 is swung. Thus, when the handle 50 is moved from the first position P1 (two-dot chain line) to the second position P2 (solid line), the handle 50 passes through a position facing the pivot axis RA and then collides with the second projecting part 106b so as to press the second projecting part 106b, without coming into contact with the first projecting part 106a that is located on the upstream side of the second projecting part 106b along the movement path of the handle 50. Since the handle 50 presses the second projecting part 106b, the switching member 106 is moved from the first holding position P21 toward the second holding position P22.

A switching mechanism 100 in this modification example further includes a plate-like member 28a disposed in the armrest 28. Opposed ends of the plate-like member 28a are supported by a pair of support pieces 28b. In addition, the switching member 106 includes a pressing and projecting part 106c projecting inward the armrest 28. In the armrest 28, the pressing and projecting part 106c is located on a position opposed to the plate-like member 28a. As shown in FIGS. 12 and 13, when the switching member 106 is located between the first holding position P21 and the second holding position P22, the pressing and projecting part 106c of the switching member 106 is in contact with the plate-like member 28a so as to resiliently deform the plate-like member 28a. Namely, a range in which the switching member 106 is swingable, i.e., a range between the first holding position P21 and the second holding position P22, includes an urging area. When the switching member 106 is positioned in the urging area, the switching member 106 is urged toward the first holding position P21 or toward the second holding position P22.

In the illustrated example, when the switching member 106 is located on an intermediate position between the first holding position P21 and the second holding position P22, the plate-like member 28a is most deformed. That is to say, there exists a dead center on the intermediate position between the first holding position P21 and the second holding position P22. When the switching member 106 is located on a side of the first holding position P21 relative to the dead center, the switching member 106 is urged toward the first holding position P21 by a restoring force of the plate-like member 28a. On the other hand, when the switching member 106 is located on a side of the second holding position P22 relative to the dead center, the switching member 106 is urged toward the second holding position P22 by the restoring force of the plate-like member 28a.

In the above manner, the switching member 106 of the switching mechanism 100 is turned in accordance with the swinging movement of the handle 50. When the handle 50 is located on the first position P1, the switching member 106 is held on the first holding position P21. When the handle 50 is located on the second position P2, the switching member 106 is held on the second holding position P22.

In the example shown in FIGS. 11 to 13, an end of the lead wire 122 of the first transmission mechanism 120 on the side of the switching mechanism 100 is fixed on the switching member 106 at a position near to the first projecting part 106a via a rotatable pulley 29a disposed in the armrest 28. The position where the end of the tubular member 124 of the first transmission mechanism 120 on the side of the switching mechanism 100 is fixed in the armrest 28, is determined such that the lead wire 122 is drawn out from the tubular member 124 to the side of the switching mechanism 100 when the switching member 106 is located on the second holding position P22, and that the lead wire 122 is pushed into the tubular member 124 from the side of the switching mechanism 100 when the switching member 106 is located on the first holding position P21.

Similarly, an end of the lead wire 132 of the second transmission mechanism 130 on the side of the switching mechanism 100 is fixed on the switching member 106 at a position near to the second projecting part 106b via a rotatable pulley 29b disposed in the armrest 28. The position where the end of the tubular member 132 of the second transmission mechanism 130 on the side of the switching mechanism 100 is fixed in the armrest 28, is determined such that the lead wire 132 is pushed into the tubular member 134 from the side of the switching mechanism 100 when the switching member 106 is located on the second holding position P22, and that the lead wire 132 is drawn out from the tubular member 134 to the side of the switching mechanism 100 when the switching member 106 is located on the first holding position P21.

Other structures of the first transmission mechanism 120 and the second transmission mechanism 130 may be the same as those of the above embodiment. Excluding the points as described herein, a stroller 10 in the modification example shown in FIGS. 11 to 13 can be structured similarly to the above embodiment. According to such a structure, similarly to the above embodiment, when the first switching member 106 is located on the first holding position P21, turning of the front wheel 61 is automatically regulated, while turning of the rear wheel 81 is automatically enabled. On the other hand, when the first switching member 106 is located on the second holding position P22, the turning of the front wheel 61 is automatically enabled, while the turning of the rear wheel 81 is automatically regulated. According also to this modification example, an operation for switching the conditions of the wheels 61 and 81 linked to a position of the handle 50 can be performed in a more stable and reliable manner.

In the example shown in FIGS. 11 to 13, although the switching member 106 of the switching mechanism 100 is pressed by the handle 50 while it is being swung, so that the position of the switching member 106 is changed between the first holding position P21 and the second holding position P22, the present invention is not limited thereto. The projecting parts 106*a* and 106*b* may be projectable in the trajectory zone of a certain member (e.g., the aforementioned sliding member 55) disposed on the handle 50, the trajectory zone being defined when the handle 50 is swung. In this case, the projecting part 106*a* or 106*b* is pressed by the member disposed on the handle 50, so that the switching member 106 is moved between the first holding position P21 and the second holding position P22.

In addition, the following modifications are possible as other modification examples of the above embodiment.

In the above embodiment, both the caster mechanism for front leg 60 and the caster mechanism for rear leg 80 are provided with the locking members 75 and 95. However, not limited thereto, only one of the caster mechanisms may be provided with the locking member. In this case, the wheel of the caster mechanism on which the locking member is not provided may be turnable with respect to the back and forth direction of the stroller 10, or may be unturnably rotatable and positioned along the back and forth direction of the stroller 10.

The overall structure of the stroller 10 explained in the above embodiment is nothing more than a mere example. For example, the frame part 20 may be configured to be unfoldable.

Further, the structure of the caster mechanism explained in the above embodiment is nothing more than a mere example. For example, the structure of a caster mechanism disclosed in JP2002-284015A may be employed.

Some modification examples of the aforementioned embodiment are explained above. It goes without saying that these modification examples may be suitably combined with each other.

The invention claimed is:

1. A stroller comprising:
a frame part including a front leg and a rear leg,
a handle connected to the frame part so as to be swingable between a first position and a second position;
a caster mechanism disposed at least on one of the front leg and the rear leg, the caster mechanism including a wheel, a wheel holder configured to rotatably and turnably hold the wheel, and a locking member capable of being moved between a locking position for regulating a turning of the wheel and an unlocking position for enabling the turning of the wheel;
a switching mechanism including a switching member which is configured to be held on a first holding position when the handle is located on the first position, and to be held on a second holding position when the handle is located on the second position; and
a transmission mechanism disposed between the switching mechanism and the caster mechanism, and configured to transmit, to the locking member, a movement of the switching member between the first holding position and the second holding position, so as to move locking member from the unlocking position to the locking position or from the locking position to the unlocking position;

wherein:
the frame part further includes an armrest connected with the front leg and the rear leg,
the switching member is pivotably supported in the armrest;
the switching member includes a projecting part that is projectable in a trajectory zone of the handle, which is defined when the handle is swung, or a trajectory zone of a member disposed on the handle, which is defined when the handle is swung;
the projecting part can project from the armrest,
the switching member is structured such that, when the handle or the member disposed on the handle presses the projecting part during a movement of the handle from the first position to the second position or from the second position to the first position, the switching member is turned between the first holding position and the second holding position,
when the switching member is held on the second holding position, the projecting part of the switching member is located within the trajectory zone of the handle or within the trajectory zone of the member disposed on the handle, and is pressed by the handle or the member disposed on the handle, which is swung from the second position toward the first position, and
the projecting part of the switching member is pressed up to a position outside the trajectory zone of the handle or outside the trajectory zone of the member disposed on the handle, by the handle or the member disposed on the handle, which is swung from the second position toward the first position.

2. The stroller according to claim 1, wherein
a caster mechanism for front leg is disposed on a lower end of the front leg, and a caster mechanism for rear leg is disposed on a lower end of the rear leg, and
the transmission mechanism includes a first transmission mechanism disposed between one of the caster mechanism for front leg and the caster mechanism for rear leg and the switching mechanism, and a second transmission mechanism disposed between the other of the caster mechanism for front leg and the caster mechanism for rear leg and the switching mechanism.

3. The stroller according to claim 2, wherein
the first transmission mechanism includes a lead wire whose opposed ends are respectively fixed to the switching member and the locking member of the caster mechanism for front leg, and a tubular member through which the lead wire passes,
the second transmission mechanism includes a lead wire whose opposed ends are respectively fixed to the switching member and the locking member of the caster mechanism for rear leg, and a tubular member through which the lead wire passes,
when the switching member is moved from the first holding position toward the second holding position, the lead wire of the first transmission mechanism is, in accordance with the movement of the switching member, drawn outside the tubular member of the first transmission mechanism from one end, adjacent to the switching mechanism, of the tubular member of the first transmission mechanism, and is drawn into the tubular member of the first transmission mechanism from the other end, adjacent to the caster mechanism for the front leg, of the tubular member of the first transmission mechanism, and the lead wire of the second transmission mechanism is, in accordance with the movement of the switching member, pushed into the tubular member of the second transmission mechanism from one end, adjacent to the switching mechanism, of the tubular member of the second transmission mechanism, and is pushed outside the tubular member of the second transmission mechanism from the other end, adjacent to the caster mechanism for the rear leg, of the tubular member of the second transmission mechanism, and when the switching member is moved from the second holding position toward the first holding position, the lead wire of the first transmission mechanism is, in accordance with the movement of the switching member, pushed into the tubular member of the first transmission mechanism from the end, adjacent to the switching mechanism, of the tubular member of the first transmission mechanism, and is pushed outside the tubular member of the first transmission mechanism from the end, adjacent to the caster mechanism for the front leg, of the tubular member of the first transmission mechanism, and the lead wire of the second transmission mechanism is, in accordance with the movement of the switching member, drawn outside the tubular member of the second transmission mechanism from the end, adjacent to the switching mechanism, of the tubular member of the second transmission mechanism, and is drawn into the tubular member of the second transmission mechanism form the end, adjacent to the caster mechanism for the rear leg, of the tubular member of the second transmission mechanism.

4. The stroller according to claim 1, wherein the caster mechanism is disposed at least on a lower end of the front leg.

5. The stroller according to claim 4, wherein the transmission mechanism includes a lead wire whose opposed ends are respectively fixed to the switching member and the locking member of the caster mechanism disposed on the lower end of the front leg, and a tubular member through which the lead wire passes, when the switching member is moved from the first holding position toward the second holding position, the lead wire of the transmission mechanism is, in accordance with the movement of the switching member, drawn outside the tubular member of the transmission mechanism from the end of the tubular member on the side of the switching mechanism, and is drawn into the tubular member of the transmission mechanism from the end of the tubular member on the side of the caster mechanism, and when the switching member is moved from the second holding position toward the first holding position, the lead wire of the transmission mechanism is, in accordance with the movement of the switching member, pushed into the tubular member of the transmission mechanism from the end of the tubular member on the side of the switching mechanism, and is pushed outside the tubular member of the transmission mechanism from the end of the tubular member on the side of the caster mechanism.

6. The stroller according to claim 1, wherein the transmission mechanism includes a lead wire whose opposed ends are respectively fixed to the switching member and the locking member of the caster mechanism, and a tubular member through which the lead wire passes, when the switching member is moved from the first holding position toward the second holding position, the lead wire of the transmission mechanism is, in accordance with the movement of the switching member, drawn outside the tubular member of the transmission mechanism from the end of the tubular member on the side of the switching mechanism, and is drawn into the tubular member of the transmission mechanism from the end of the tubular member on the side of the caster mechanism, and when the switching member is moved from the second holding position toward the first holding position, the lead wire of the transmission mechanism is, in accordance with the movement of the switching member, pushed into the tubular member of the transmission mechanism from the end of the tubular member on the side of the switching mechanism, and is pushed outside the tubular member of the transmission mechanism from the end of the tubular member on the side of the caster mechanism.

7. The stroller according to claim 1, wherein a part of the switching member is positioned in the armrest.

8. The stroller according to claim 1, wherein a pivot axis of the switching member is extended perpendicularly to a movement trajectory of a part of the handle or a part of the member disposed on the handle, the part being capable of coming into contact with the projecting part, when the handle is swung.

9. The stroller according to claim 1, wherein the transmission mechanism includes a lead wire whose opposed ends are respectively fixed to the switching member and the locking member, and a tubular member through which the lead wire passes, and an end of the lead wire on the side of the switching mechanism is fixed on the switching member at a position near to the projecting part.

10. The stroller according to claim 1, wherein the switching member includes:

a first projecting part structured such that, when the switching member is located on the second holding position, the first projecting part projects in the trajectory zone of the handle or in the trajectory zone of the member disposed on the handle, so as to be pressed by the handle or the member disposed on the handle during the swinging movement of the handle from the second position toward the first position; and a second projecting part structured such that, when the switching member is located on the first holding position, the second projecting part projects in the trajectory zone of the handle or in the trajectory zone of the member disposed on the handle, so as to be pressed by the handle or the member disposed on the handle during the swinging movement of the handle from the first position toward the second position.

11. The stroller according to claim 1 wherein the switching mechanism is structured such that, when the switching member is located on an intermediate position between the first holding position and the second holding position, the switching member is urged toward the first holding position or the second holding position.

12. The stroller according to claim 1, wherein the handle is inclined forward on the first position, and is inclined rearward on the second position.

13. A stroller comprising:
a frame part including a front leg and a rear leg;
a handle connected to the frame part so as to be swingable between a first position and a second position;
a caster mechanism disposed at least on one of the front leg and the rear leg, the caster mechanism including a wheel, a wheel holder configured to rotatably and turnably hold the wheel, and a locking member capable of being moved between a locking position for regulating a turning of the wheel and an unlocking position for enabling the turning of the wheel;
a switching mechanism including a switching member which is configured to be held on a first holding position when the handle is located on the first position, and to be held on a second holding position when the handle is located on the second position; and
a transmission mechanism disposed between the switching mechanism and the caster mechanism, and configured to transmit, to the locking member, a movement of the switching member between the first holding position and the second holding position, so as to move the locking member from the unlocking position to the locking position or from the locking position to the unlocking position;

wherein:

the switching member is slidably disposed on the handle;
the switching member is arranged on the first holding position on the handle when the handle is located on the first position, and is arranged on the second holding position on the handle, which is different from the first holding position, when the handle is located on the second position;
the frame part further includes: a first engagement member that is engaged with the switching member, when the handle is located on the first position, so as to hold the switching member on the first holding position; and a second engagement member that is engaged with the switching member, when the handle is located on the second position, so as to hold the switching member on the second holding position,
the switching member is movable on the handle in a longitudinal direction of the handle, and
an axial displacement provided by a sliding movement of the switching member on the handle exists between the first holding position and the second holding position in the longitudinal direction of the handle.

14. The stroller according to claim 13, wherein:
the switching member is movable on the handle in a longitudinal direction of the handle; and
a distance between the switching member and a swing center of the handle along the longitudinal direction of the handle differs depending on whether the switching member is located on the first holding position or the switching member is located on the second holding position.

15. The stroller according to claim 13, wherein:
the frame part further includes an armrest connected with the front leg and the rear leg; and
the first engagement member and the second engagement member are disposed on the armrest.

16. The stroller according to claim 13, wherein the switching member and the frame part are structured such that, when the switching member is engaged with the first engagement member, the swinging movement of the handle from the first position is regulated, and that, when the switching member is engaged with the second engagement member, the swinging movement of the handle from the second position is regulated.

17. A stroller comprising:
a frame part including a front leg and a rear leg,
a handle connected to the frame part so as to be swingable between a first position and a second position;
a caster mechanism disposed at least on one of the front leg and the rear leg, the caster mechanism including a wheel, a wheel holder configured to rotatably and turnably hold the wheel, and a locking member capable of being moved between a locking position for regulating a turning of the wheel and an unlocking position for enabling the turning of the wheel;
a switching mechanism including a switching member which is configured to be held on a first holding position when the handle is located on the first position, and to be held on a second holding position when the handle is located on the second position; and
a transmission mechanism disposed between the switching mechanism and the caster mechanism, and configured to transmit, to the locking member, a movement of the switching member between the first holding position and the second holding position so as to move locking member from the unlocking position to the locking position or from the locking position to the unlocking position;

wherein:

the frame part further includes an armrest connected with the front leg and the rear leg,
the switching member is pivotably supported in the armrest;
the switching member includes a projecting part that is projectable in a trajectory zone of the handle, which is defined when the handle is swung, or a trajectory zone of a member disposed on the handle, which is defined when the handle is swung;
the projecting part can project from the armrest,
the switching member is structured such that, when the handle or the member disposed on the handle presses the projecting part during a movement of the handle from the first position to the second position or from the second position to the first position, the switching member is turned between the first holding position and the second holding position, and
a pivot axis of the switching member is extended in parallel with an imaginary plane including a movement trajectory of a part of the handle or a part of the member disposed on the handle, the part being capable of coming into contact with the projecting part, when the handle is swung.

18. A stroller comprising:
a frame part including a front leg and a rear leg,
a handle connected to the frame part so as to be swingable between a first position and a second position;
a caster mechanism disposed at least on one of the front leg and the rear leg, the caster mechanism including a wheel, a wheel holder configured to rotatably and turnably hold the wheel, and a locking member capable of being moved between a locking position for regulating a turning of the wheel and an unlocking position for enabling the turning of the wheel;
a switching mechanism including a switching member which is configured to be held on a first holding position when the handle is located on the first position, and to be held on a second holding position when the handle is located on the second position; and
a transmission mechanism disposed between the switching mechanism and the caster mechanism, and configured to transmit, to the locking member, a movement of the switching member between the first holding position and the second holding position, so as to move locking member from the unlocking position to the locking position or from the locking position to the unlocking position;

wherein:

the frame part further includes an armrest connected with the front leg and the rear leg, the switching member is pivotably supported in the armrest;

the switching member includes a projecting part that is projectable in a trajectory zone of the handle, which is defined when the handle is swung, or a trajectory zone of a member disposed on the handle, which is defined when the handle is swung;

the projecting part can project from the armrest, the switching member is structured such that, when the handle or the member disposed on the handle presses the projecting part during a movement of the handle from the first position to the second position or from the second position to the first position, the switching member is turned between the first holding position and the second holding position, and when the switching member is held on the first holding position, the projecting part of the switching member is located outside the trajectory zone of the handle or outside the trajectory zone of the member disposed on the handle.

\* \* \* \* \*